US009919642B2

(12) United States Patent
Llewellyn et al.

(10) Patent No.: US 9,919,642 B2
(45) Date of Patent: Mar. 20, 2018

(54) CONTAINER-SECURING DEVICE (71) Applicant: Bluewater Resources LLC, Cotulla, TX (US)

(72) Inventors: Jake Llewellyn, Cotulla, TX (US); Neal Llewellyn, Cotulla, TX (US); John Llewellyn, Fort Worth, TX (US); Rickey Mason, Cotulla, TX (US)

(73) Assignee: Bluewater Resources LLC, Cotulla, TX (US)

( * ) Notice: Subject to any disclaimer, the term of this patent is extended or adjusted under 35 U.S.C. 154(b) by 0 days.

(21) Appl. No.: 15/284,339

(22) Filed: Oct. 3, 2016

(65) Prior Publication Data

US 2018/0029520 A1    Feb. 1, 2018

Related U.S. Application Data (60) Provisional application No. 62/369,543, filed on Aug. 1, 2016.

(51) Int. Cl.
*B60P 7/08* (2006.01)
(52) U.S. Cl.
CPC .................................. *B60P 7/0892* (2013.01)
(58) Field of Classification Search
CPC .. B60P 7/08; B60P 7/13; B60P 7/0807; B60P 7/0815; B60P 3/36; B60P 7/0892; B60P 7/12; B60P 7/132
USPC ........... 410/77, 82, 69, 80, 90, 94; 296/37.6, 296/39.2, 43; 224/403, 404, 542, 544
See application file for complete search history.

(56) References Cited

U.S. PATENT DOCUMENTS

| 2,016,861 | A |   | 7/1936 | Lowe |
| 3,130,689 | A | * | 4/1964 | Johnston ............. B61D 45/001 410/149 |
| 3,429,151 | A | * | 2/1969 | Weingart ............. E05C 19/182 292/290 |
| 4,047,749 | A |   | 9/1977 | Whaley et al. |
| 4,212,251 | A |   | 7/1980 | DiMaritino |
| 4,502,619 | A | * | 3/1985 | Cox .......................... B60P 7/15 211/208 |
| 4,531,774 | A |   | 7/1985 | Whatley |

(Continued)

FOREIGN PATENT DOCUMENTS

GB         2277122         8/1995

*Primary Examiner* — D Glenn Dayoan
*Assistant Examiner* — Sunsurraye Westbrook
(74) *Attorney, Agent, or Firm* — D. Tiller Law PLLC; Donald Tiller (57) ABSTRACT A system and method for securing a container to a transport surface is disclosed. The system includes a capture member and a locking member. The locking member is configured to be attached to the surface and to securely engage one end of the capture member. The capture member includes one end configured to securely engage the locking member and a second end configured to securely engage the container. The locking member is optionally configured to require a key to disengage the capture member from the locking member. The method includes attaching the locking member to the surface, disposing a container on the surface next to the locking member, and positioning the capture member such that it securely engages the locking member at one end and securely engages the container at the other end, and thereby secures the container to the surface.

5 Claims, 11 Drawing Sheets (56) References Cited

U.S. PATENT DOCUMENTS

| | | | |
|---|---|---|---|
| 4,772,165 A * | 9/1988 | Bartkus | B60P 7/15 211/7 |
| 5,186,588 A * | 2/1993 | Sutton | B60R 9/0485 182/127 |
| 5,447,049 A | 9/1995 | Shieh | |
| 54,720,167 | 12/1995 | Shillington et al. | |
| 5,644,445 A | 9/1997 | Chang | |
| 5,676,258 A * | 10/1997 | Leyden | A47F 5/0861 211/59.1 |
| 5,927,916 A | 7/1999 | Kroll et al. | |
| 5,992,187 A | 11/1999 | Derman | |
| 6,053,692 A | 4/2000 | Mason et al. | |
| 6,098,434 A | 8/2000 | Liou | |
| 6,135,686 A * | 10/2000 | Chasen | B60P 7/08 182/127 |
| 6,477,870 B1 | 11/2002 | Derman | |
| 6,523,378 B2 | 2/2003 | Kuo | |
| 6,539,758 B2 | 4/2003 | Meekma et al. | |
| 6,543,260 B2 | 4/2003 | Koy et al. | |
| 6,575,679 B2 | 6/2003 | Bourgault et al. | |
| 6,588,720 B1 | 7/2003 | Revette | |
| 6,626,480 B2 | 9/2003 | Anderson | |
| 6,736,585 B2 | 5/2004 | O'Daniel | |
| 6,782,725 B2 | 8/2004 | Linares | |
| 6,793,081 B1 | 9/2004 | Derman | |
| 7,001,122 B2 * | 2/2006 | Bommarito | B60P 7/0807 296/39.2 |
| 7,171,833 B1 | 2/2007 | Wu | |
| 7,353,671 B2 * | 4/2008 | Recknagel | B60D 1/60 280/507 |
| 7,448,236 B2 | 11/2008 | Recknagel et al. | |
| 7,473,062 B2 | 1/2009 | Laflamme | |
| 8,777,531 B2 | 7/2014 | Massicotte et al. | |
| 2002/0108407 A1 * | 8/2002 | Zapushek | B60D 1/60 70/34 |
| 2010/0072215 A1 | 3/2010 | Coon | |
| 2011/0217139 A1 | 9/2011 | Walker | |
| 2011/0221222 A1 | 9/2011 | Ross | |
| 2012/0080467 A1 | 4/2012 | Irwin et al. | |
| 2013/0026171 A1 | 1/2013 | James, Jr. | |
| 2014/0223952 A1 | 8/2014 | Smith et al. | |
| 2014/0319306 A1 | 10/2014 | Massicotte et al. | |
| 2015/0360599 A1 | 12/2015 | Bean | |

* cited by examiner

CONTAINER-SECURING DEVICE

CROSS-REFERENCE TO RELATED APPLICATIONS

This application claims the benefit of U.S. Provisional Application No. 62/369,543, filed on Aug. 1, 2016, the entirety of which is hereby incorporated by reference.

BACKGROUND

This invention generally pertains to systems and methods for securing a transport container to a transport surface. More specifically, it pertains to a device that can be readily installed on a transport surface, such as the bed of a pickup truck, and that binds the container to the surface and thereby limits the movement of the container relative to the surface during transport and can further be used to lock the container in place to prevent or deter theft of the container.

The use of securing devices to secure containers to a surface is well known. Typically, part or all of the securing device is attached to the surface and a portion of the securing device is attached to the container.

Prior-art container-securing devices generally suffer from one or more of three main failings. First, the securing device may be difficult or cumbersome to install. Installation may require specialized skills or tools, or the efforts of multiple workers. Second, the securing device may require significant modifications to the transport surface. Third, the securing device may operate with only specialized or modified containers.

For example, U.S. Pat. No. 7,473,062 to Michel Laflamme ("Laflamme") discloses a cargo-restraint system having a floor structure consisting of slats that are installed on a transport surface, the slats having a number of holes to accept elbowed fasteners that in turn hold rails to the slats. The slats, holes, fasteners, and rails are configured such that the rails may be fastened in a customized position and orientation so as to keep a cargo item from sliding on the surface of the slats while it is in transport. The device of Laflamme undesirably requires the installation of the specialized slats to the transport surface and does not provide any mechanism to lock the cargo down to the surface to deter shifting or theft.

U.S. Pat. No. 8,777,531 to Massicotte et al. ("Massicotte") discloses another example of a prior-art securing device. The device consists of a rack having multiple apertures each aperture configured to receive an anchor. Containers and the like that are specially configured for the anchor can be secured to the rack by attachment via the anchor. Or generic containers and the like can be secured to the rack by a bungee cord or the like hooked to one or more anchors. The anchors may be placed in various apertures to provide for securing a variety of containers. The device of Massicotte undesirably requires installation of the specialized rack to the transport surface or vehicle and does not provide any mechanism to lock the container to deter theft.

U.S. Pat. No. 6,575,679 to Bourgault et al. ("Bourgault") discloses another example of a prior-art securing device. The device consists of two anchor beams installed front-to-back in the box of a pick-up truck such that there is a left-to-right open space between the beams. The beams are configured to capture the lower edges of a container as the container slides into the truck box from the back, or tail, of the truck box. Flat members with edges equivalent to the lower edges of the container are placed between the anchor beams and in front of or in back of the container such that the container and flat members fill the open space between the beams. These "locking" members are then secured into place by closing the tail gate or fastening a stop member to the tail-end of one or both anchor beams. The device of Bourgault undesirably requires installation of the specialized anchor beams to the transport surface, requires a specialized container, and does not provide any mechanism to lock the container to deter theft.

U.S. Patent Application Publication No. 2014/0223952 to Smith et al. ("Smith") discloses another example of a prior-art securing device. The device is a magnet that is attached to the base of the container (in this instance, a cooler). The magnetic force between the magnet and the appropriate transport surface secures the container to the surface (in this instance, the bed of a truck). The device of Smith undesirably requires installation of the magnet to the container and does not provide any mechanism to lock the container to deter theft.

Accordingly, there is a need for a container-securing device that is relatively simple to install to a transport surface, has minimal impact on the transport surface, and does not require a specialized or modified container.

SUMMARY

The present invention is directed to systems and methods that satisfy the need for a device to secure a transport container to a surface.

In one aspect of the invention, the container-securing device has a capture member, a locking member, and a fastener by which the locking member may be attached to a transport surface. The capture member has a pin extending down from one end and an arm extending out from the other end. The locking member includes a box shaped to receive the capture member's pin and a locking mechanism configured to securely engage the capture member's pin. The locking mechanism includes a bolt that is configured to engage the pin, such as by entering into a hole or groove in the pin. The locking mechanism also includes an actuator that is configured to move the bolt to engage or disengage the pin, such as when the actuator is pushed, pulled, or rotated. The locking mechanism may be keyed, such that a key is necessary to engage or disengage the bolt from the pin. The fastener may include a threaded bolt and a magnetized nut. The fastener may include a plate with a projecting pin, this plate may be magnetized In another aspect of the invention, the container-securing device has a capture member, a locking member, and a fastener by which the locking member may be attached to a transport surface. The capture member has a locking mechanism with a box extending down from one end and an arm extending out from the other end. The locking member includes a pin shaped to enter the locking mechanism's box and to securely engage the capture member's locking mechanism. The locking mechanism includes a bolt that is configured to engage the pin, such as by entering into a hole or groove in the pin. The locking mechanism also includes an actuator that is configured to move the bolt to engage or disengage the pin, such as when the actuator is pushed, pulled, or rotated. The locking mechanism may be keyed, such that a key is necessary to engage or disengage the bolt from the pin. The locking member fastener may include a threaded bolt and a magnetized nut. The fastener may include a plate with a projecting pin, this plate may be magnetized.

In another aspect of the invention, a method for securing a container to a transport surface includes fastening a locking member to the surface, placing the container next to the locking member, and positioning a capture member such that it securely engages the locking member at one end and securely engages the container at the other end.

In another aspect of the invention, a method for attaching a locking member to a transport surface includes providing a ferromagnetic transport surface, finding or drilling a hole through the surface, placing a magnetized nut or a magnetized plate with a projecting pin on the underside of the surface below the hole, placing the locking member on the topside of the surface above the hole, and placing a threaded bolt through a hole in the locking member and into the magnetized nut or placing a pin or threaded bolt into the projecting pin.

Through practice of various aspects of the invention, a container-securing device that can be readily installed to a transport surface, requires minimal modification of the surface, and is adaptable for various container shapes and sizes can be constructed and used.

BRIEF DESCRIPTION OF THE SEVERAL VIEWS OF THE DRAWING

These and other features, aspects, and advantages of the present invention will be become better understood with reference to the following description, appended claims, and accompanying drawings where:

DETAILED DESCRIPTION OF THE INVENTION

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature, not to an instance of use of the invention.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently to a feature that is "exact." For example, a component A is "substantially" perpendicular to a second component B if A and B are at an angle such as to equivalently satisfy the technological purpose of A being perpendicular to B.

Except as otherwise stated herein, or as is otherwise clear from context, the term "or" is used herein in its inclusive sense. For example, "A or B" means "A or B, or both A and B."

Except as is otherwise clear from context: (1) the term "up" is used herein to denote the direction away from the container-side of a transport surface or toward the side of the transport surface that is opposite the container side and (2) the term "down" is used herein to denote the direction toward the container-side of the transport surface or away from the side of the transport surface that is opposite the container side.

The terms "push locking mechanism" and "plunger locking mechanism" are used herein to denote the class of locks in which the actuator of the locking bolt or recess is controlled by pushing or pulling. Push (or plunger) locking mechanisms are well-known and are described in, for example, U.S. Pat. Nos. 2,046,831 and 5,447,049. Commercial embodiments of such locking mechanisms include, for example, the Tubular Push Locks FJM-2610 by FJM Security (http://www.fjmsecurity.com/Push-Locks.php).

The term "rotating locking mechanism" is used herein to denote the class of locks in which the actuator of the locking bolt or recess is controlled by rotating. Rotating locking mechanisms are well-known and are described in, for example, U.S. Pat. No. 5,664,445, No. 5,992,187, and U.S. Pat. No. 7,448,236. Commercial embodiments of such locking mechanisms include, for example, Model No. 2847DAT by Master Lock (http://www.masterlock.com/personal-use/product/2847DAT).

In the context of a locking mechanism, the term "bolt" refers to the component of the locking mechanism that can be moved to engage another component or a workpiece to prevent something from moving or opening (activate) or to disengage another component or a workpiece to allow something to move or open (deactivate). In the context of a locking mechanism, the term "actuator" refers to the component of the locking mechanism that activates or deactivates the bolt.

Figure 1A:
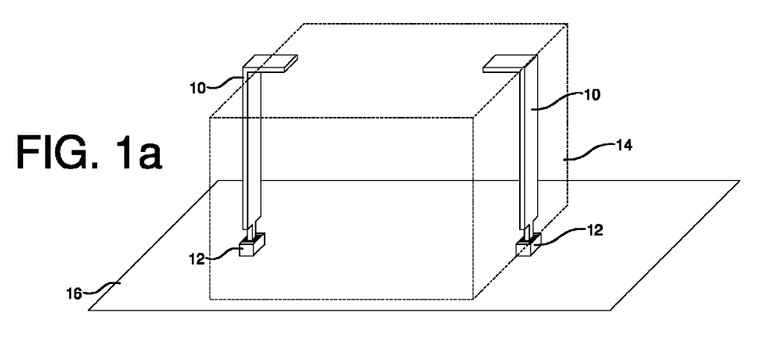
FIG. 1a is a perspective view illustrating an exemplary embodiment of a container-securing device.

An exemplary container-securing device is shown in FIG. 1a. A capture member 10 has a pin at one end, which end is oriented down toward a transport surface 16, and an arm at the other end, which other end is oriented up away from the transport surface 16. The pin is configured to mate with a box in a locking member 12. The arm is configured to fit snugly against the top of a container 14 when the pin is mated with the box of the locking member 12. The top of the container 14 is the surface of the container 14 that is oriented away from the transport surface 16. The locking member 12 is fastened to the transport surface. The locking member 12 is configured to selectively secure the pin in the box so that the pin will not substantially move relative to the box. As such, capture members 10 and locking members 12 may be placed about the container 14 to keep the container from moving relative to the transport surface 16 during transport. The locking member 12 is optionally configured with a keyed locking mechanism such that a key is needed to secure or release the pin of the capture member 10 from the box of the locking member 12. With such a key-controlled locking member 12, the container 14 may be secured both against movement during transport and against theft. Alternatively, the capture member 10 may be configured with a box end instead of a pin end and locking member 12 may be configured with a pin instead of a box.

Figure 1B:
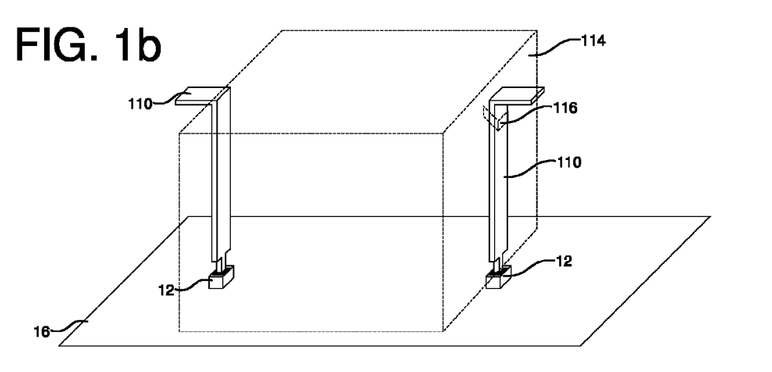
FIG. 1b is a perspective view illustrating another exemplary embodiment of a container-securing device.

Another exemplary container-securing device is shown in FIG. 1b. Capture member 110 can be substantially understood with reference to the description of the capture member 10 of the FIG. 1a embodiment. In FIG. 1b, the capture member 110 is further configured to fit snugly against a feature 116 of a side surface of a container 114. Here, the feature 116 is a handle, such as may be used on the side of a chest or a cooler. The feature 116 can also be a hook or a slot, such as may be used to engage a strap or rope, among other things.

Figure 2A:
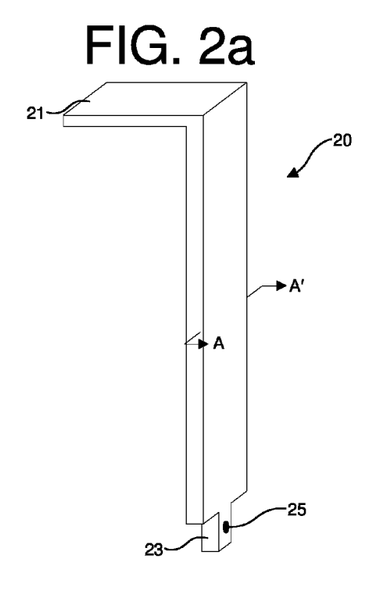
FIGS. 2a-2g are various views illustrating various exemplary embodiments of the capture member of a container-securing device.
Figure 2B:
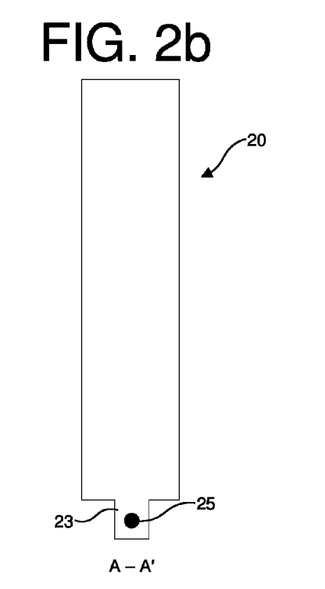

Exemplary capture members are shown in FIGS. 2a-2g. FIG. 2a is a perspective view of an exemplary capture member 20 roughly in the shape of an inverted "L." An arm 21 extends out from the body of the capture member 20, shown here extending at a substantially right angle from the body. A pin 23 includes a hole 25 that engages a bolt in the box of the locking member 12 to selectively secure the pin 23 in the box of the locking member 12. For example, the locking member 12 may comprise a push (or plunger) locking mechanism to control the positioning of a bolt within the hole 25 and secure it in place using a key, thereby preventing movement of the bolt, and any capture member engaged with the bolt, without a key. FIG. 2b is a sectional view of section A-A' of the capture member 20.

Figure 2C:
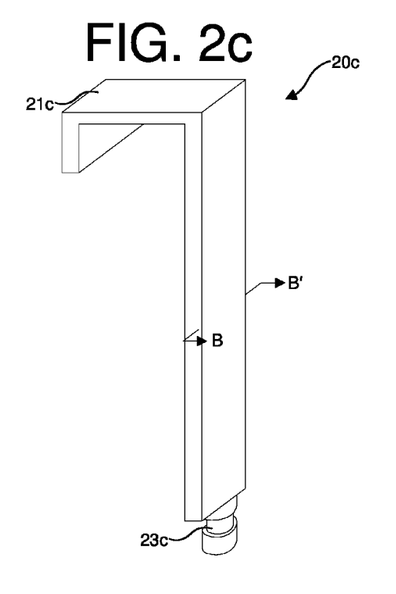
Figure 2D:
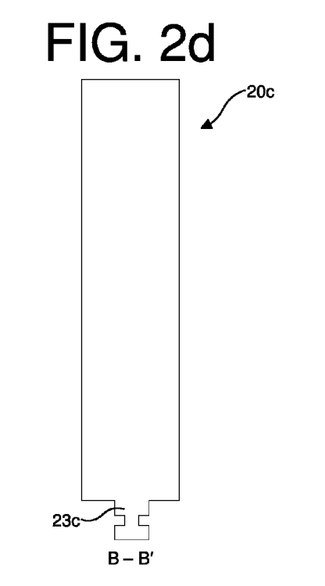

FIG. 2c is a perspective view of an exemplary capture member 20c. In this embodiment, the arm 21c includes a downward oriented portion at its end farthest from the body of the capture member 20c. This downward oriented portion serves as a hook to better secure a feature of a side surface of the secured container, such as the handle 116 shown in FIG. 1b. The pin 23c in this embodiment is shown as including a groove that engages a bolt(s) in the box of the locking member 12 to selectively secure the pin 23c in the box of the locking member 12. For example, the locking member 12 may comprise a push or rotating locking mechanism to control the positioning of a bolt(s) in the groove and secure the bolt(s) in place using a key, thereby preventing movement of the bolt(s), and any capture member engaged with the bolt(s), without a key. FIG. 2d is a sectional view of section B-B' of the capture member 20c.

Figure 2E:
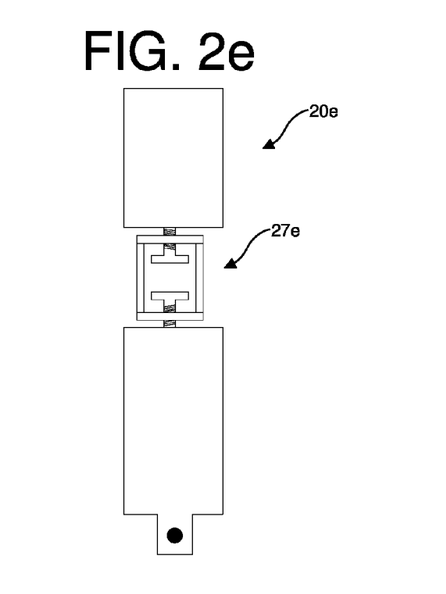

FIG. 2e is a side view of an exemplary capture member 20e. In this embodiment, the capture member 20e is segmented into two pieces joined by a turn-buckle 27e. The turn-buckle 27e can be tightened or loosened to change the length of the capture member 20e. Thus, the capture member 20e is configurable to work with containers of different sizes.

Figure 2F:
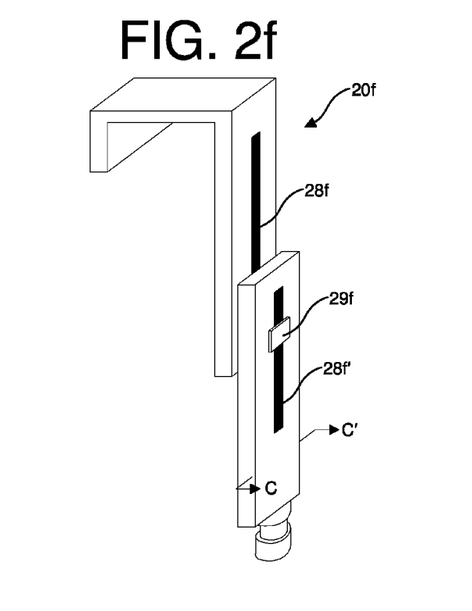
Figure 2G:
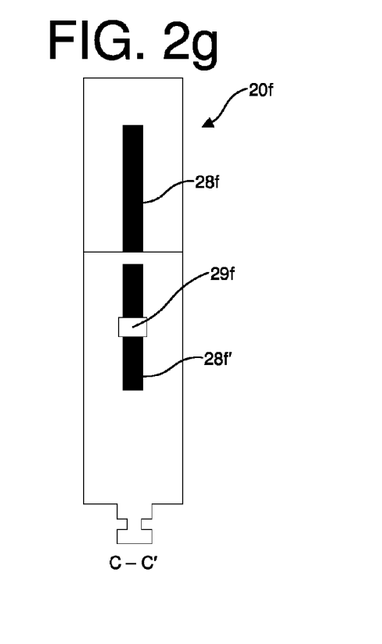

FIG. 2f is a perspective view of an exemplary capture member 20f. In this embodiment, the capture member 20f is segmented into two pieces that are joined by a fastener 29f that runs through slots 28f, 28f cut into the two pieces of the capture member 20f. The fastener 29f may be a bolt, cotter pin, or the like, and it may be keyed, such as a locking lug nut on an automobile wheel is keyed. The capture member 20f can be lengthened or shortened by loosening the fastener 29f, moving the two pieces of the capture member 20f relative to each other, and then tightening the fastener 29f. Thus, capture member 20f is configurable to work with containers of different sizes. FIG. 2g is a sectional view of section C-C' of the capture member 20f.

The capture arm may be made from various materials. For example, the capture arm may be made entirely from metal or plastic or from some combination thereof and it may be made entirely from solid or tubular material or from some combination thereof. The material of the capture arm is not a limiting factor of the invention.

Figure 3A:
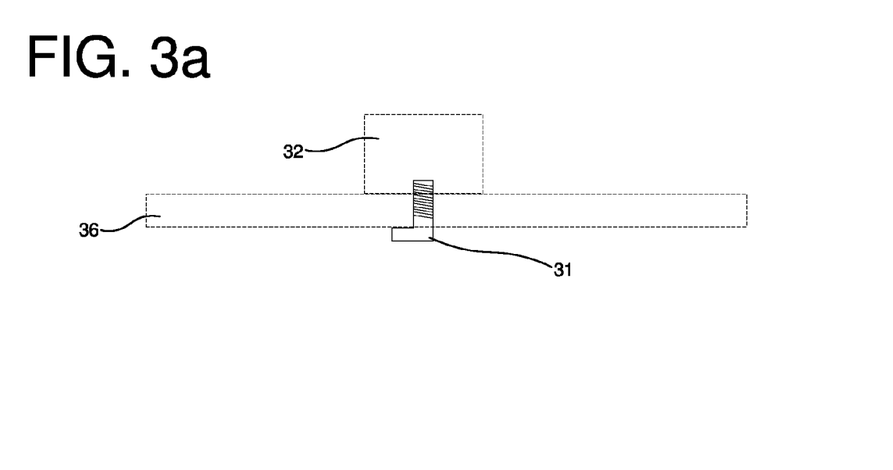
FIGS. 3a-3c are side views illustrating various exemplary embodiments of the locking member of a container-securing device.
Figure 3B:
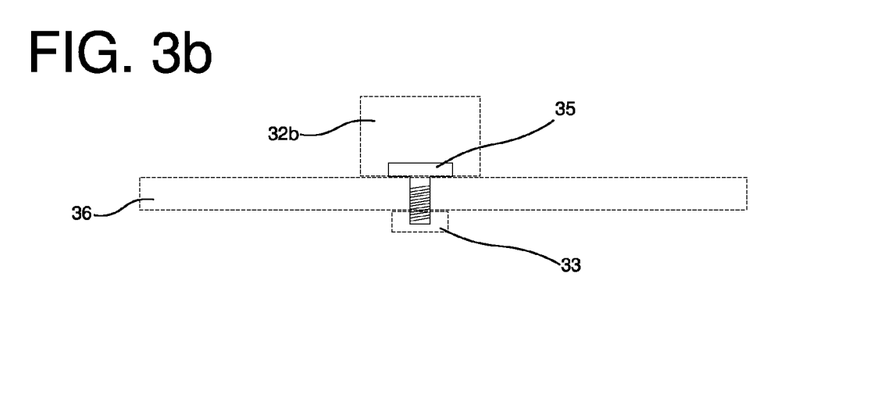
Figure 3C:
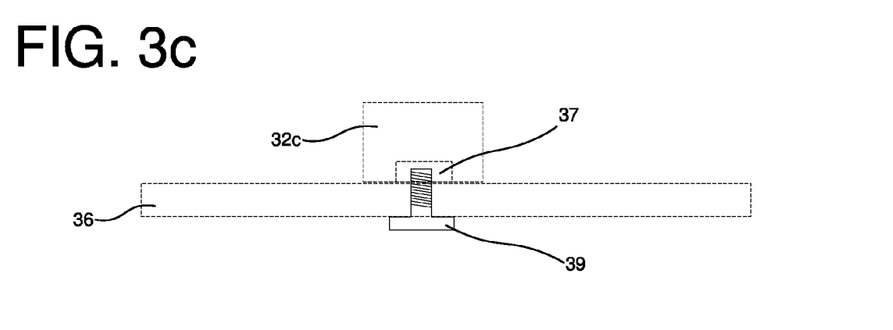

Exemplary locking members are shown in FIGS. 3a-3c. FIG. 3a is a side view of an exemplary locking member 32 fastened to a transport surface 36. An "L" shaped bolt 31 is fed up through a hole in the surface 36. Locking member 32 has a threaded hole that is used to thread the locking member 32 onto the bolt 31 to secure the locking member 32 to the surface 36. Alternatively, the bolt 31 may feed through a hole in the locking member 32 and a nut within the locking member 32 can be threaded onto the bolt to fasten the locking member 32 to the transport surface 36. The surface of the bolt 31 that engages the bottom side of the transport surface 36 is preferably serrated such that as the locking member 32 is threaded onto the bolt 31 the serrated surface digs into the bottom side of the transport surface 36 so that the bolt 31 does not rotate with the locking member 32. In this manner, a single person with minimal tools can install the locking member 32 to the transport surface 36 or remove the locking member 32 from the surface 36.

FIG. 3b is a side view of an exemplary locking member 32b fastened to a transport surface 36. In this embodiment, a bolt 35 within the locking member 32b is fed down through a hole in the locking member 32b, through a hole in the transport surface 36, and into a nut 33 on the underside of the transport surface 36. Alternatively, the bolt 35 may be an integral portion of the locking member 32b. The nut 33 that the bolt 35 threads into is preferably bonded to the bottom side of the transport surface 36 such that the nut 33 does not have to be held in place and does not rotate with the bolt 35 as the bolt 35 threads into the nut 33. For example, the nut 33 may be made of magnetized material, or embedded in magnetized material, such that it can be bonded to the bottom side of a ferromagnetic transport surface 36 through a magnetic force. In this manner, a single person with minimal tools can install the locking member 32b to the transport surface 36 or remove the locking member 32b from the surface 36. Alternatively, the nut 33 may be bonded to the transport surface 36 with glue, epoxy, or the like, or may be welded to the surface 36.

FIG. 3c is a side view of an exemplary locking member 32c fastened to a transport surface 36. In this embodiment, a bolt 39 is fed up through a hole in the transport surface 36, through a hole in the locking member 32c, and into a nut 37 within the locking member 37. Alternatively, the nut 37 may be an integral part of the locking member 32c (e.g., a threaded hole in the locking member 32c or a nut bonded to the locking member 32c). The bolt 39 that feeds into the nut 37 is preferably bonded to the bottom side of the transport surface 36 such that the bolt 39 does not have to be held in place and does not rotate with the nut 37 as the nut 37 threads onto the bolt 39. For example, the bolt 39 may be made of magnetized material, or embedded in magnetized material, such that it can be bonded to the bottom side of a ferromagnetic transport surface 36 through a magnetic force. In this manner, a single person with minimal tools can install the locking member 32c to the transport surface 36 or remove the locking member 32c from the surface 36. Alternatively, the bolt 39 may be bonded to the transport surface 36 with glue, epoxy, or the like, or may be welded to the surface 36.

Figure 4A:
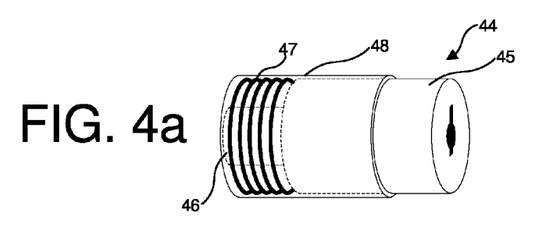
FIGS. 4a-4b are perspective views illustrating an exemplary embodiment of a push (or plunger) locking mechanism.
Figures 4B, 4C:
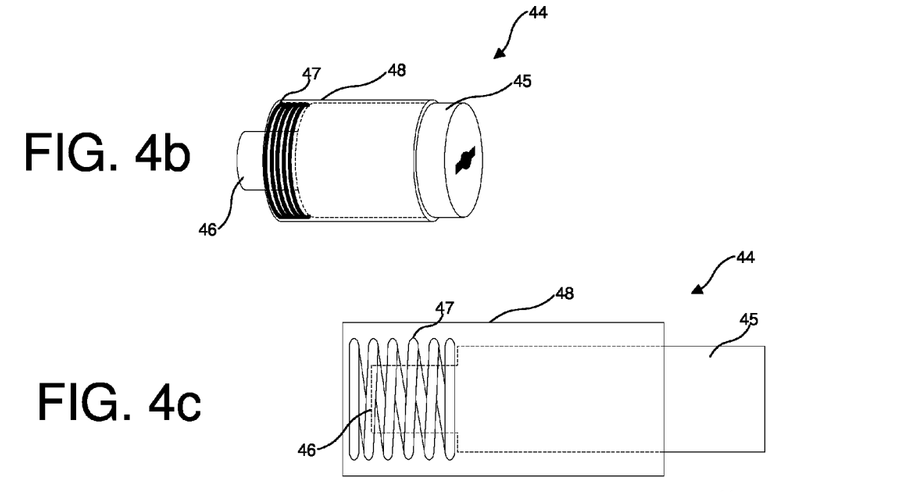
FIGS. 4c-4e are side views illustrating various exemplary embodiments of a push (or plunger) locking mechanism.

FIG. 4a is a perspective view of an exemplary push (or plunger) locking mechanism 44 that can be included in a locking member. The locking mechanism 44 is shown in the relaxed position. The locking mechanism 44 includes a keyed inner cylinder 45 (the actuator), a bolt 46, and a spring 47 all deployed within an outer cylinder 48. The outer cylinder 48 may be an integral piece of the locking member, or it may be separate from but affixed within the locking member. The bolt 46 is attached to, or is originally formed as an integral member of, the inner cylinder 45. The inner cylinder 45 may slide within the outer cylinder 48 and the spring 47 is deployed such as to compress when the inner cylinder 45 slides into the outer cylinder 48 such that the spring generates a force to push the inner cylinder 45 back toward the relaxed position. When the inner cylinder 45 slides into the outer cylinder 48, the bolt 46 extends from the outer cylinder 48 through a hole in the outer cylinder 48 such that it can engage a box or hole in a capture member's pin. The inner cylinder 45 may be rotated within the outer cylinder 48 by inserting a key into the key hole and turning. In this way, the inner cylinder 45 may be locked into position thereby locking the bolt 46 into position. FIG. 4b depicts the exemplary push (or plunger) locking mechanism 44 locked in a bolt-extended position.

Figures 4D, 4E:
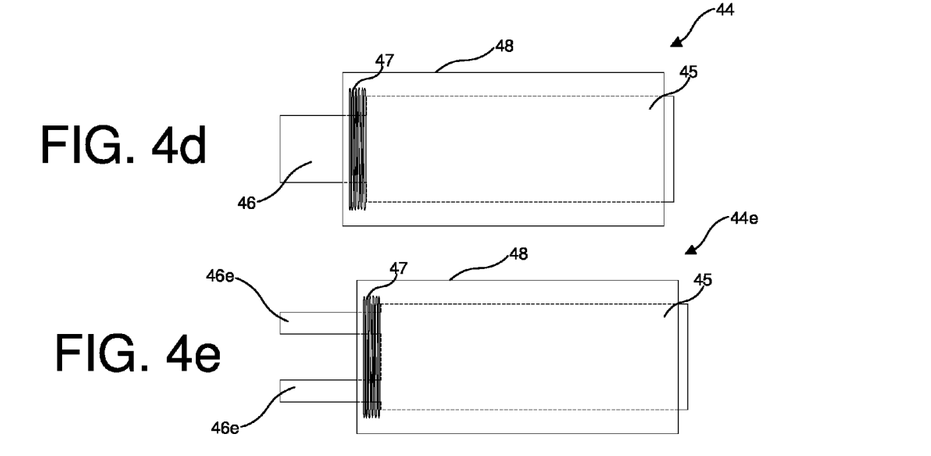

FIG. 4c is a side view of an exemplary push (or plunger) locking mechanism 44 in the relaxed position. FIG. 4d is a side view of an exemplary push (or plunger) locking mechanism 44 in the bolt-extended position. FIG. 4e is a side view of an exemplary push (or plunger) locking mechanism 44e in the bolt-extended position wherein there are two bolts 46e that are configured to engage a groove in a capture member's pin end.

Push (or plunger) locking mechanisms are well-known and are described in, for example, U.S. Pat. Nos. 2,046,831 and 5,447,049. Commercial embodiments of such locking mechanisms include, for example, the Tubular Push Locks FJM-2610 by FJM Security (http://www.fjmsecurity.com/Push-Locks.php). Such prior-art push (or plunger) locking mechanisms may be used within the container-securing device with or in lieu of the exemplary push (or plunger) locking mechanisms described herein. Further, while the above embodiments are described with a keyed inner cylinder 45, the inner cylinder 45 need not be keyed for applications where deterring theft is not important. In such an unkeyed locking mechanism, the inner cylinder 45 may be rotated without a key and moved from the locked, bolt-extended position by, for example, slightly pushing or pulling the inner cylinder 45 into or out of the outer cylinder 48 to unlatch the cylinders.

Figure 5:
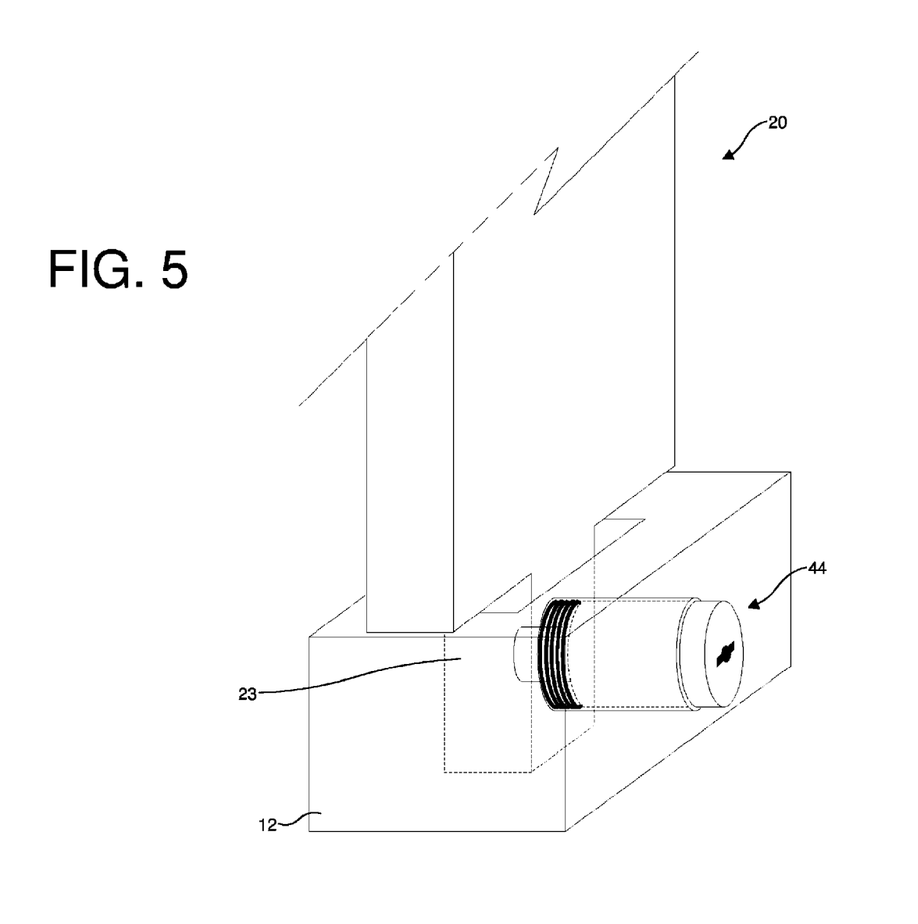
FIG. 5 is a perspective view illustrating an exemplary capture member securely mated with an exemplary locking member comprising a push locking mechanism.

FIG. 5 is a perspective view of an exemplary capture member 20 mated with an exemplary locking member 12 via a hole in the capture member's pin 23 engaging with the bolt of an exemplary push locking mechanism 44 included in the locking member 12.

Figure 6A:
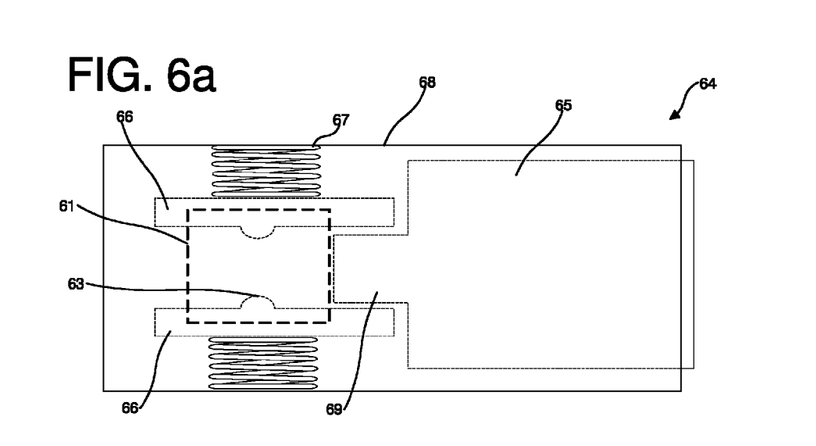
FIGS. 6a-6b are side views illustrating an embodiment of a rotating locking mechanism.
Figure 6B:
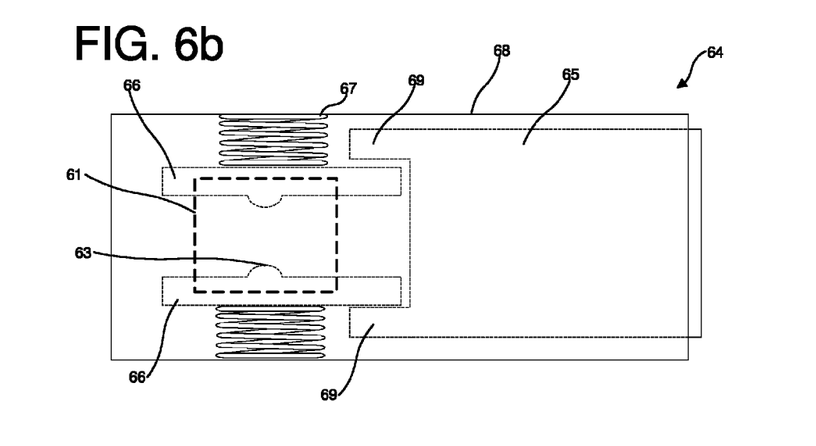

FIGS. 6a-6b are top views of an exemplary rotating locking mechanism 64 that can be included in a locking member. In FIG. 6a, the locking mechanism 64 is shown in the relaxed position. In FIG. 6b, the locking mechanism 64 is shown in the locked position. The locking mechanism 64 includes a keyed inner cylinder 65 (the actuator), bolt-plates 66 (the bolts), and springs 67 all deployed within an outer cylinder 68. The outer cylinder 68 may be an integral piece of the locking member, or it may be separate from but affixed within the locking member. The inner cylinder 65 may rotate within the outer cylinder 68 when the appropriate key is used. The bolt-plates 66 each include a protrusion 63 shaped to engage the groove of the capture member's pin. The inner cylinder 65 includes tabs 69 shaped to rotate to fit between the bolt-plates 66 and the outer cylinder 68 when the locking mechanism 64 is place in the locked mode. The pin of a capture member enters the locking mechanism 64 through an aperture 61. When the grooves of the capture member's pin engage the protrusions 63, the bolt-plates 66 spread apart to accept or release the capture member's pin. Preferably, the edges of the capture member's pin are beveled to allow a smooth transfer of force from the pin to the bolt-plates 66. Once the protrusions 63 are mated with the grooves of the capture member's pin, the inner cylinder 65 can be rotated to move the tabs 69 between the bolt-plates 66 and the outer cylinder 68 to keep the bolt-plates 66 from spreading apart and thereby locking the capture member in place. This exemplary embodiment is shown with two moving bolt-plates and tabs, but may comprise one or more moving bolt-plates and tabs.

Figure 7A:
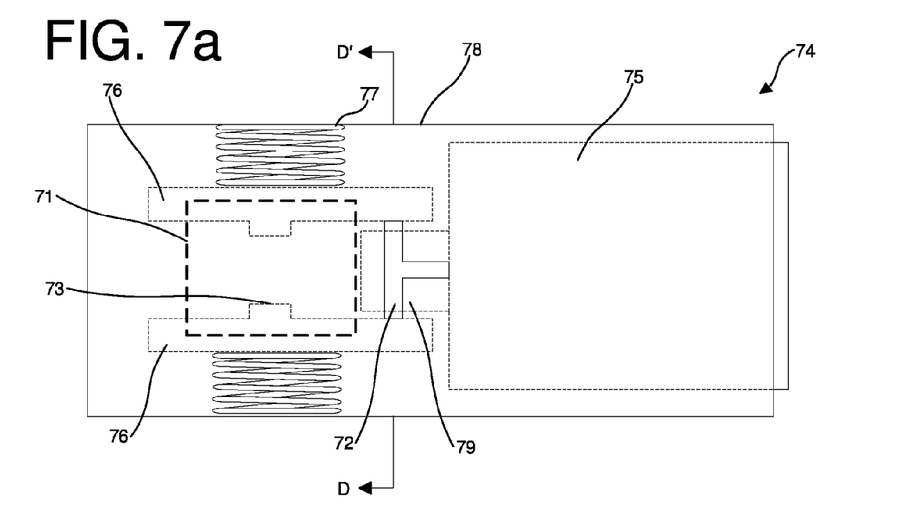
FIGS. 7a-7e are various views illustrating an embodiment of a rotating locking mechanism.
Figure 7B:
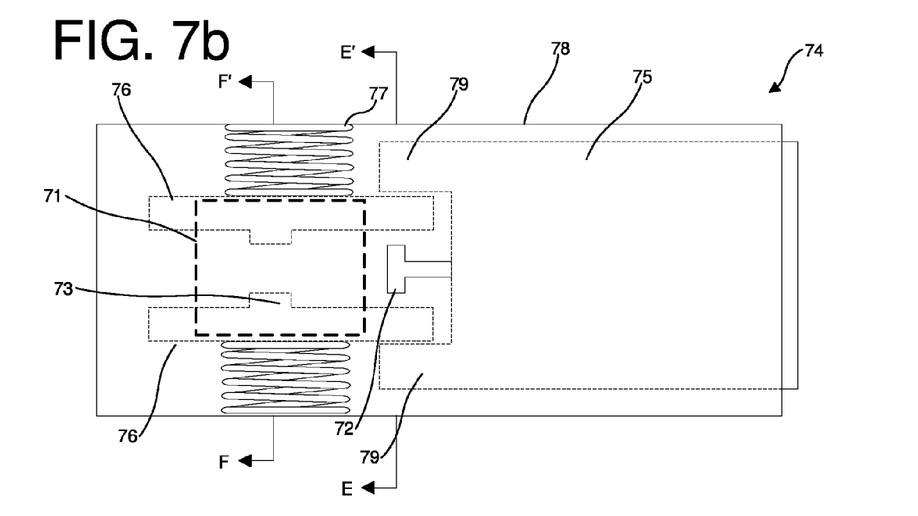
Figure 7C:
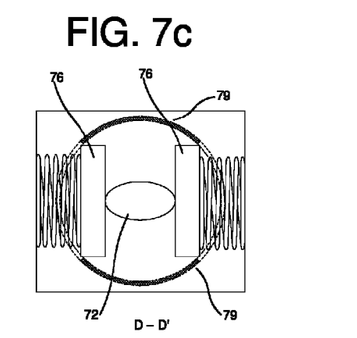
Figure 7D:
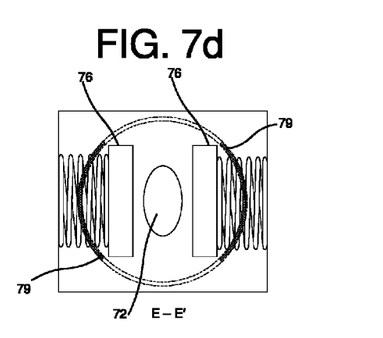
Figure 7E:
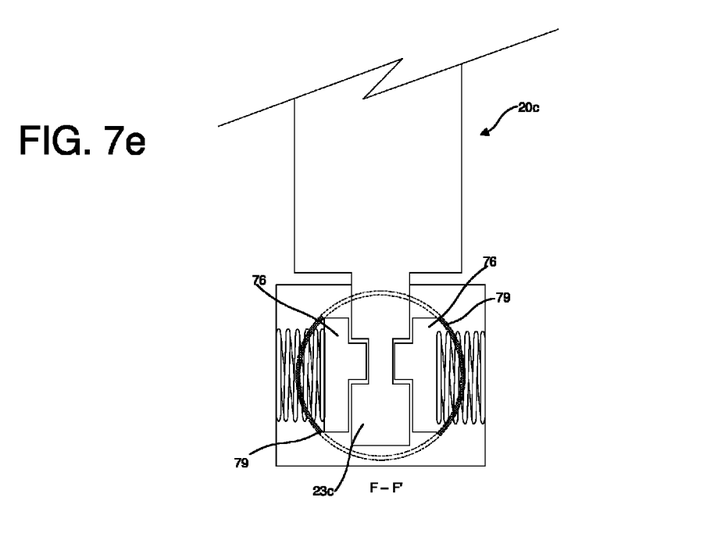

FIGS. 7a-7b are top views of an exemplary rotating locking mechanism 74 that can be included in a locking member. In FIG. 7a, the locking mechanism 74 is shown in the relaxed position. In FIG. 7b, the locking mechanism 74 is shown in the locked position. The locking mechanism 74 includes a keyed inner cylinder 75, bolt-plates 76, and springs 77 all deployed within an outer cylinder 78. The outer cylinder 78 may be an integral piece of the locking member, or it may be separate from but affixed within the locking member. The inner cylinder 75 may rotate within the outer cylinder 78 when the appropriate key is used. The bolt-plates 76 each include a protrusion 73 shaped to engage the groove of the capture member's pin. The inner cylinder 75 includes tabs 79 shaped to rotate to fit between the bolt-plates 76 and the outer cylinder 78 when the locking mechanism 74 is place in the locked mode. The inner cylinder 75 further includes a cam 72 shaped to spread the pin-plates 76 apart when in the relaxed mode and allow them to come together when in the locked mode. The pin of a capture member enters the locking mechanism 74 through an aperture 71. Rotating the inner cylinder 75 from the relaxed to the locked position will: (1) rotate the cam 72 to allow the bolt-plates 76 to move together and the protrusions 73 on the bolt-plates 76 to engage the grooves on the pin of the capture member and (2) move the tabs 79 into a position between the bolt-plates 76 and the outer cylinder 78 to keep the bolt-plates 76 from moving apart and thereby lock the capture member in place. Rotating the inner cylinder 75 from the locked to the relaxed position will: (1) move the tabs 79 away from between the bolt-plates 76 and the outer cylinder 78 and (2) rotate the cam 72 to spread the bolt-plates 76 apart to accept or release the pin of the capture member. FIG. 7c is an end sectional view of section D-D' of FIG. 7a when the locking mechanism 74 is in the relaxed position, and the capture member's pin may be inserted into the locking mechanism. FIG. 7d is an end sectional view of section E-E' of FIG. 7b when the locking mechanism 74 is in the locked position, and the capture member's pin is secured in place within the locking mechanism 74. FIG. 7e is an end sectional view of section F-F' of FIG. 7b when the locking mechanism 74 is in the locked position, and the capture member's pin 23c is secured in place within the locking mechanism 74. This exemplary embodiment is shown with two moving bolt-plates and tabs, but may comprise one or more moving bolt-plates and tabs.

Rotating locking mechanisms are well-known and are described in, for example, U.S. Pat. No. 5,664,445, No. 5,992,187, and U.S. Pat. No. 7,448,236. Commercial embodiments of such locking mechanisms include, for example, Model No. 2847DAT by Master Lock (http://www.masterlock.com/personal-use/product/2847DAT). Such prior-art rotating locking mechanisms may be used within the container-securing device with or in lieu of the exemplary rotating locking mechanisms described herein. Further, while the above embodiments are described with a keyed inner cylinder, the inner cylinder need not be keyed for applications where deterring theft is not important. In such an unkeyed locking mechanism, the inner cylinder may be rotated without a key and moved from the locked position by, for example, slightly pushing or pulling the inner cylinder into or out of the outer cylinder to unlatch the cylinders.

Figure 8A:
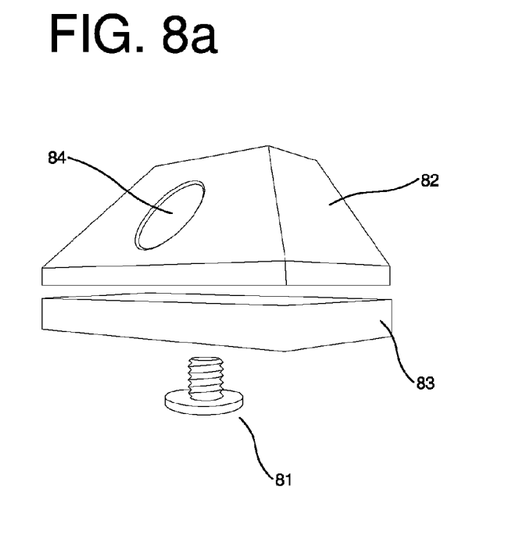
FIGS. 8a-8c are various views illustrating embodiments of a locking member of a container-securing device.
Figure 8B:
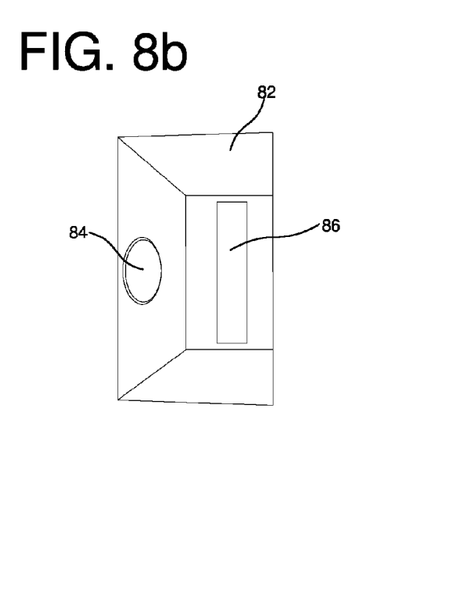
Figure 8C:
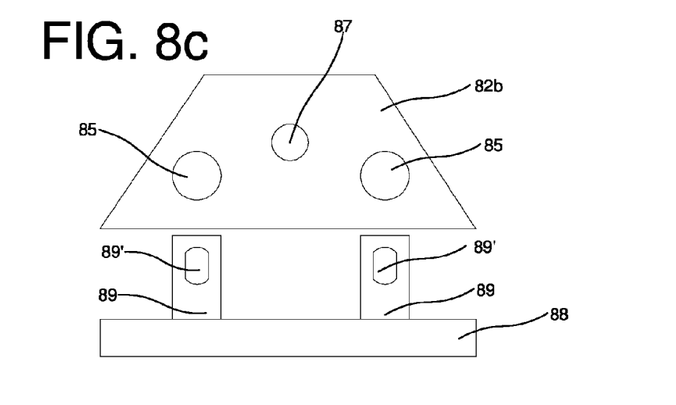

Exemplary locking members are shown in FIGS. 8a-8c. FIG. 8a is a perspective view of an exemplary locking member 82 showing a hole 84 for positioning and retaining a locking mechanism. This exemplary locking member 82 may be fastened to a transport surface using a plate 83 which retains a bolt 81. The locking member 82 is placed above the transport surface and the plate 83 and bolt 81 are placed below the transport surface such that the bolt 81 feeds up through the transport surface and into the locking member 82, securing the locking member to the transport surface. The plate 83 may be magnetized so as to adhere to the transport surface or may otherwise be held in position to fasten the locking member 82. The locking member 82 may be fastened to the transport surface using more than one bolt 81. FIG. 8b is a top view of the exemplary locking member 82 showing a box 86 configured to mate with a pin of a capture member.

FIG. 8c is side view of an exemplary locking member 82b, viewing the side of the locking member 82b that is opposite the side from which the locking mechanism is accessed by the user. This exemplary locking member 82b includes a hole 87 to accept the bolt of a push locking mechanism. The locking member 82b may be fastened to a transport surface using a plate 88 that includes upward protruding pins 89 that feed up through the transport surface and into the locking member 82b. Pins (e.g., bare or threaded bolts) are fed through holes 85 in the locking member 82b and into holes 89' in the upward protruding pins 89 of the plate 88. The plate 88 may include one or more upward protruding pins 89. The plate 88 may be magnetized so as to adhere to the transport surface or may otherwise be held in position to fasten the locking member 82b. In this embodiment, the means used to fasten or remove the locking member 82b to the transport surface will not be accessible when a container is secured to the transport surface—access to the fastening/removing means is blocked by the container.

Figure 9A:
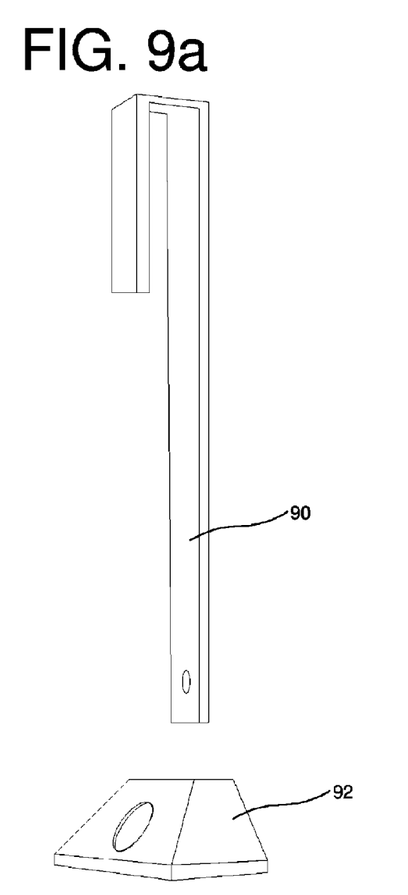
FIGS. 9a-9b are perspective views illustrating an exemplary capture member mated with an exemplary locking member.
Figure 9B:
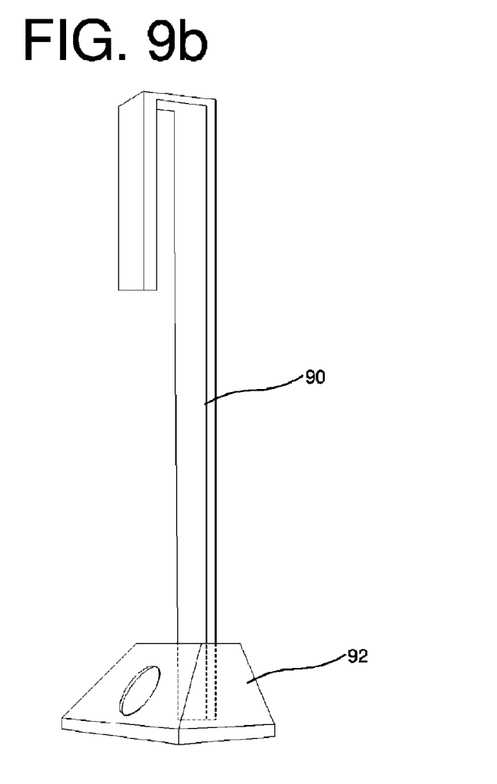

FIGS. 9a-9b are perspective views and an exemplary capture member 90 and locking member 92. FIG. 9a shows the capture member 90 and the locking member 92 as separated. FIG. 9b shows the capture member 90 and the locking member 92 mated such as to secure a container to a transport surface.

Exemplary benefits of the container-securing device can be understood with respect to FIG. 1b. Using the device, a container 114, such as a cooler, can be secured to a transport surface 16, such as the bed of a pick-up truck. By running capture members 110 through side features 116 (e.g., handles, slots, hooks, etc.) on the container 114 to locking members 12 attached to the transport surface 16, the container-securing device prevents the container 114 from moving side-to-side or up-and-down with respect to the surface 16. By using locking members 12 having keyed locking mechanisms to hold the capture members 110 in the locking members 12, the container-securing device prevents removal of the container 114 from the surface 16 without a key, thereby deterring theft of the container 114.

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. The scope of the invention is defined by the claims which follow.

The invention claimed is:

1. A method for securing a container to a transport surface, the method comprising:
    (a) attaching a locking member to a transport surface, the locking member comprising a box and a locking mechanism;
    (b) placing a container having a feature on the transport surface next to the locking member;
    (c) placing a capture member comprising an arm and a pin such that the arm securely engages the feature of the container and the pin engages the box; and
    (d) securing the pin in the box using the locking mechanism.

2. The method of claim 1 wherein the feature of the container is one of the group consisting of the top of the container, a handle, a slot, and a hook.

3. The method of claim 1 wherein the step of attaching comprises magnetically attaching a nut to the transport surface and attaching the locking member to the magnetically attached nut by placing a threaded bolt through the locking member and into the magnetically attached nut.

4. The method of claim 1 wherein the step of attaching comprises magnetically attaching a plate having a projecting pin to the transport surface and attaching the locking member to the magnetically attached plate by placing the locking member on the projecting pin and placing a securing pin through the locking member and into the projecting pin.

5. The method of claim 1 wherein the locking mechanism is one of the group consisting of a push locking mechanism and a rotating locking mechanism.

* * * * *